United States Patent
Abotabl et al.

(10) Patent No.: US 11,881,714 B2
(45) Date of Patent: Jan. 23, 2024

(54) ENERGY HARVESTING MANAGEMENT

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/652,807

(22) Filed: Feb. 28, 2022

(65) Prior Publication Data

US 2023/0275457 A1    Aug. 31, 2023

(51) Int. Cl.
*H02J 50/00* (2016.01)
*H02J 50/20* (2016.01)
*H04W 72/23* (2023.01)
*H04W 72/56* (2023.01)

(52) U.S. Cl.
CPC ............ *H02J 50/001* (2020.01); *H02J 50/20* (2016.02); *H04W 72/23* (2023.01); *H04W 72/56* (2023.01)

(58) Field of Classification Search
CPC ....... H02J 50/001; H02J 50/20; H04W 72/23; H04W 72/56; H04W 52/42; H04B 17/318; H04B 17/102; H04B 1/10; H04B 1/1027; H04B 15/02; H04B 17/0085; H04B 17/21; H04B 17/345; H04B 7/0408; H04B 7/0691; H04B 7/0695; H04B 7/0857

See application file for complete search history.

(56) References Cited

U.S. PATENT DOCUMENTS

| | | | |
|---|---|---|---|
| 11,558,878 B2* | 1/2023 | Damnjanovic | H04W 72/56 |
| 2019/0131827 A1 | 5/2019 | Johnston et al. | |
| 2020/0076240 A1* | 3/2020 | Papadopoulos | H04Q 9/00 |
| 2022/0046695 A1* | 2/2022 | Abedini | H04B 7/155 |
| 2022/0109551 A1* | 4/2022 | Bai | H04L 5/14 |

FOREIGN PATENT DOCUMENTS

| | | |
|---|---|---|
| WO | 2020236664 A1 | 11/2020 |
| WO | 2021155209 A1 | 8/2021 |

OTHER PUBLICATIONS

International Search Report and Written Opinion—PCT/US2023/062756—ISA/EPO—dated Jun. 9, 2023.

* cited by examiner

*Primary Examiner* — John W Poos
*Assistant Examiner* — Tyler J Pereny
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more parameters associated with management of multiple antenna groups of the UE for use in energy harvesting. The UE may transmit or receive signaling based at least in part on the one or more parameters of the multiple antenna groups of the UE. Numerous other aspects are described.

30 Claims, 7 Drawing Sheets

ENERGY HARVESTING MANAGEMENT

FIELD OF THE DISCLOSURE

Aspects of the present disclosure generally relate to wireless communication and to techniques and apparatuses for energy harvesting management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of one or more parameters associated with management of multiple antenna groups of the UE for use in energy harvesting. The method may include transmitting or receiving signaling based at least in part on the one or more parameters of the multiple antenna groups of the UE.

Some aspects described herein relate to a UE for wireless communication. The user equipment may include a memory and one or more processors coupled to the memory. The one or more processors may be configured to receive an indication of one or more parameters associated with management of multiple antenna groups of the UE for use in energy harvesting. The one or more processors may be configured to transmit or receive signaling based at least in part on the one or more parameters of the multiple antenna groups of the UE.

Some aspects described herein relate to a non-transitory computer-readable medium that stores a set of instructions for wireless communication by a UE. The set of instructions, when executed by one or more processors of the UE, may cause the UE to receive an indication of one or more parameters associated with management of multiple antenna groups of the UE for use in energy harvesting. The set of instructions, when executed by one or more processors of the UE, may cause the UE to transmit or receive signaling based at least in part on the one or more parameters of the multiple antenna groups of the UE.

Some aspects described herein relate to an apparatus for wireless communication. The apparatus may include means for receiving an indication of one or more parameters associated with management of multiple antenna groups of the UE for use in energy harvesting. The apparatus may include means for transmitting or receiving signaling based at least in part on the one or more parameters of the multiple antenna groups of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
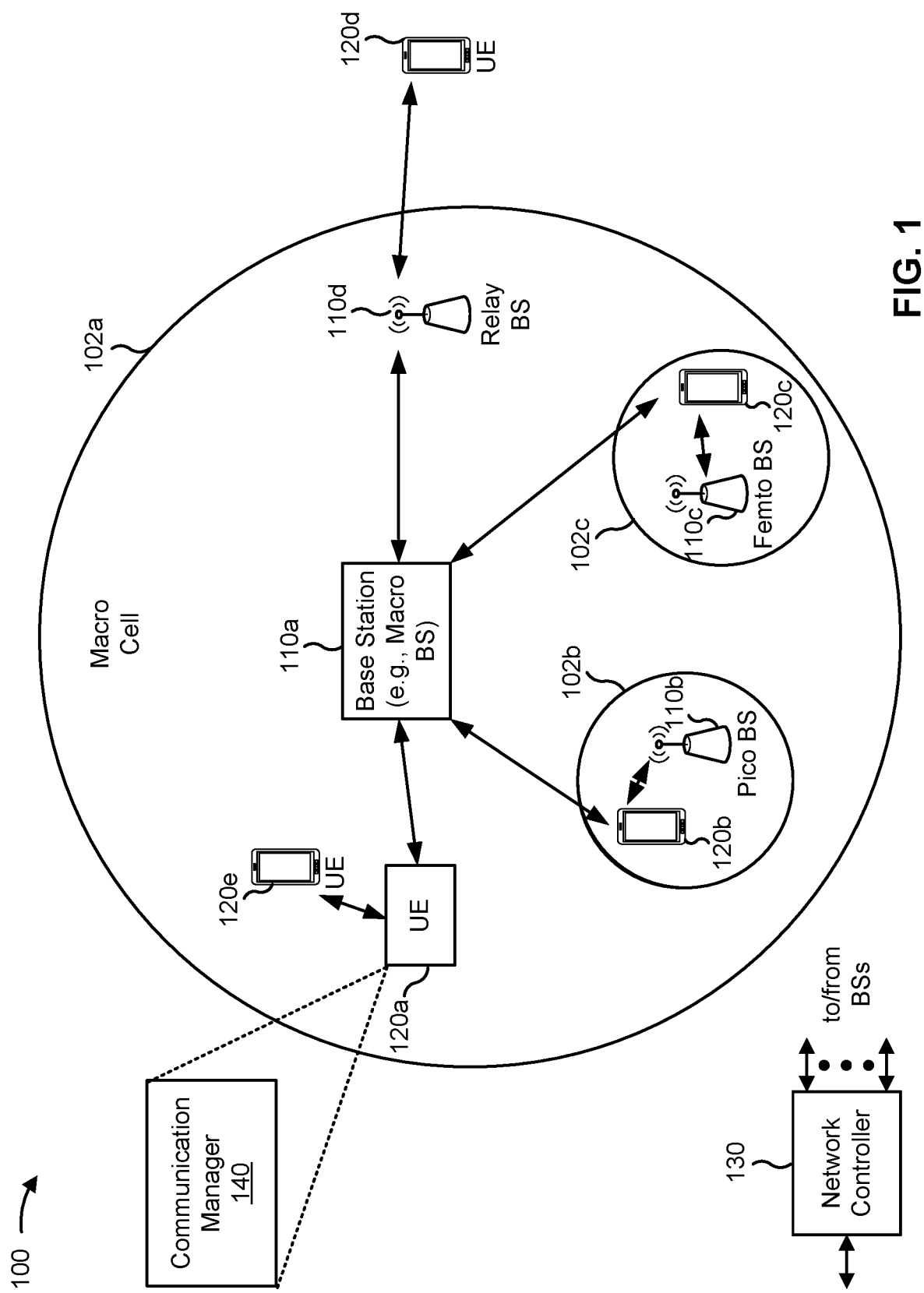
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of one or more parameters associated with management of multiple antenna groups of the UE for use in energy harvesting; and transmit or receive signaling based at least in part on the one or more parameters of the multiple antenna groups of the UE. Additionally, or alternatively, the communication manager 140 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
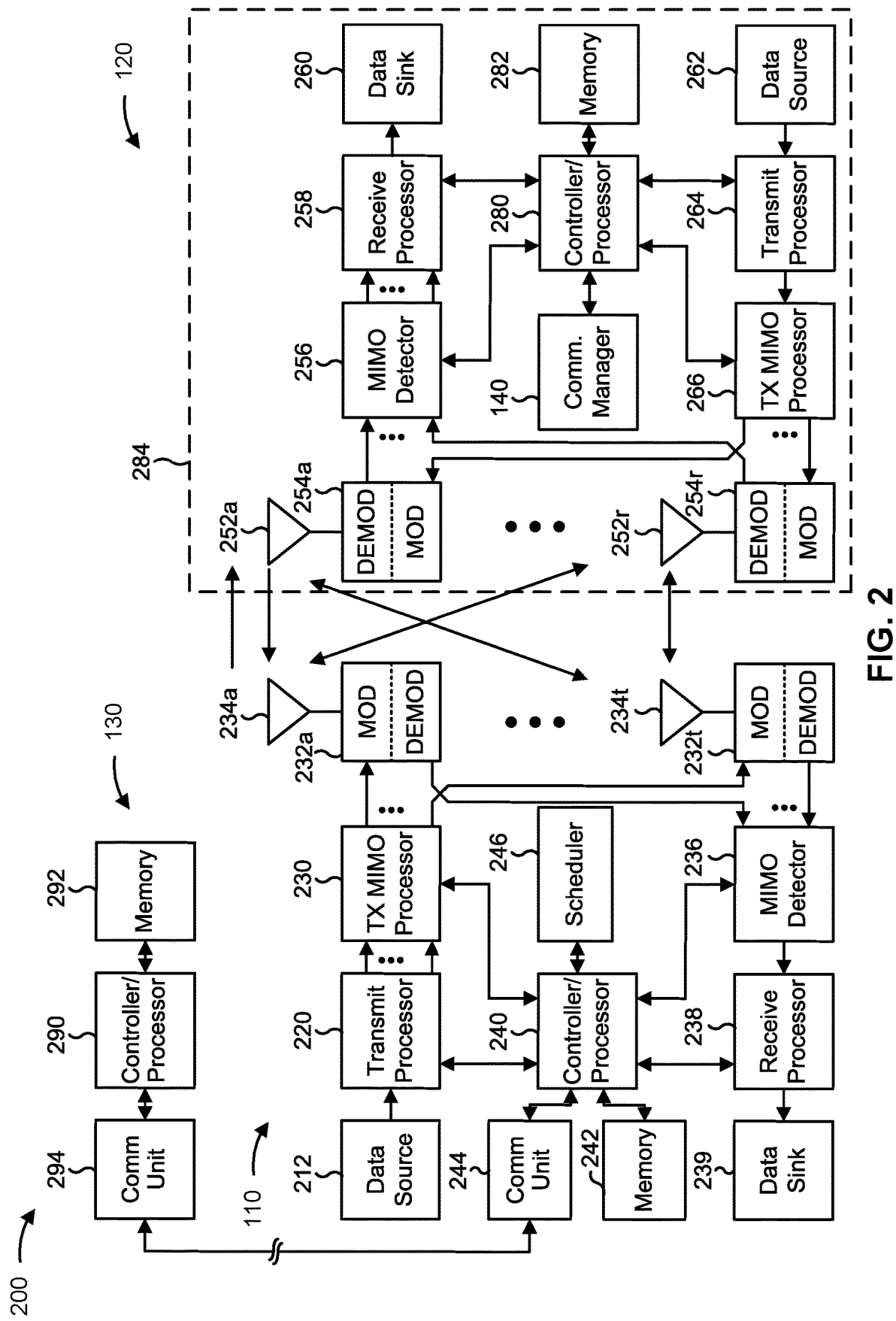
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with energy harvesting management, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the user equipment (UE) includes means for receiving an indication of one or more parameters associated with management of multiple antenna groups of the UE for use in energy harvesting; and/or means for transmitting or receiving signaling based at least in part on the one or more parameters of the multiple antenna groups of the UE. The means for the user equipment (UE) to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
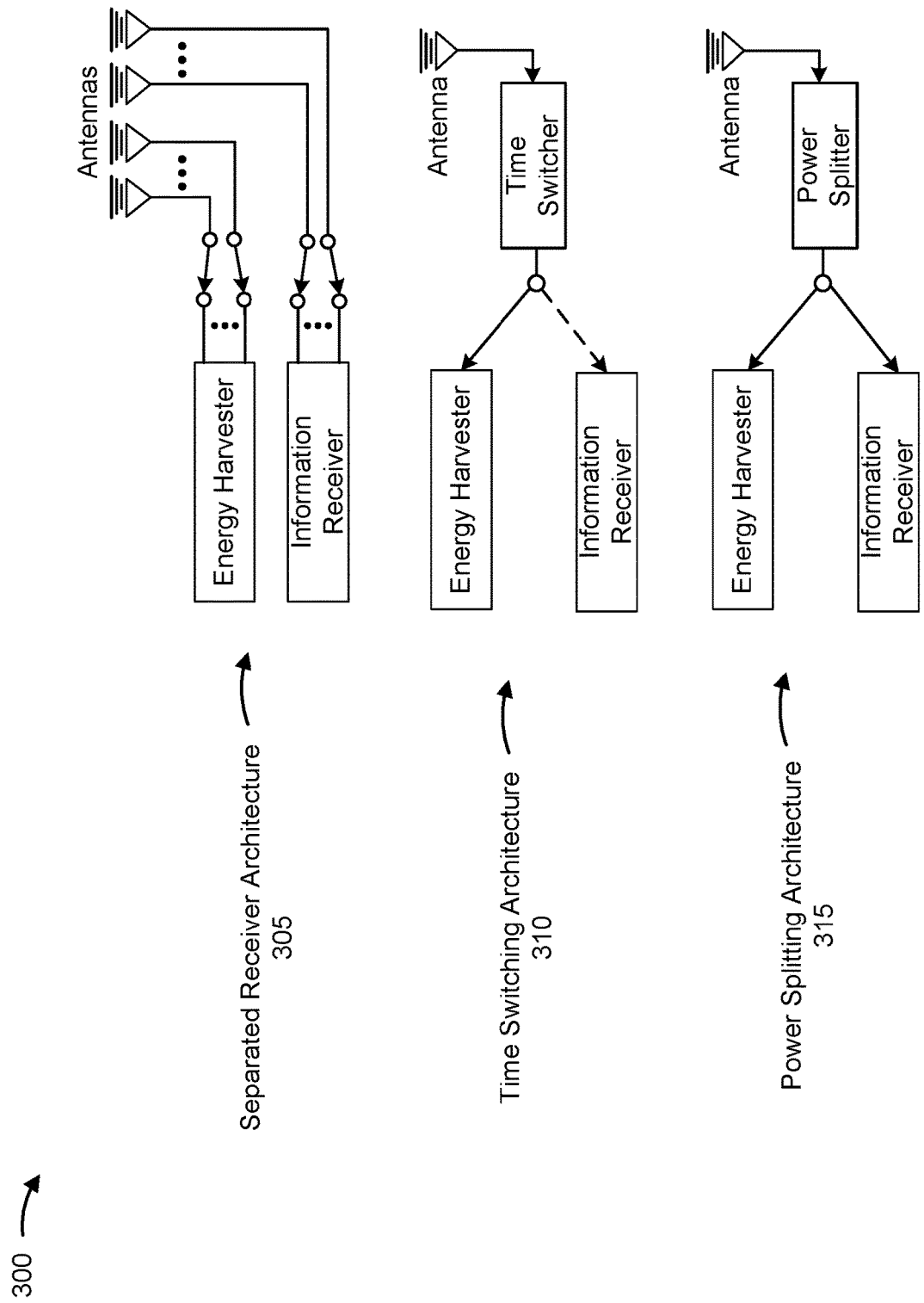
FIG. 3 is a diagram illustrating an example of energy harvesting, in accordance with the present disclosure.

FIG. 3 is a diagram illustrating an example 300 of energy harvesting, in accordance with the present disclosure.

Energy harvesting (EH) includes obtaining energy from a source other than an on-device energy storage device (e.g., a battery or a capacitor, among other examples). EH may be used to supplement energy obtained from an on-device energy storage device and/or may provide charging to the on-device energy storage device. Devices that use EH ("energy harvesting device" or "EH" device") may have a low-capacity energy storage device (e.g., smart watch) or no energy storage device (e.g., zero power devices, IoT devices, wearables, or financial devices). EH may include converting RF energy transferred from another device. Harvesting RF energy may not provide sufficient energy to fully charge a energy storage device but may be used for performing tasks such as data decoding, operating filters, data reception, data encoding, data reception, and/or data transmission, among other examples. The EH device may accumulate harvested energy over time (e.g., in an on-device energy storage device) to use in a subsequent operation. EH may also be a part of self-sustainable networks, where an EH device in the network may communicate within the network using energy harvested from transmissions of other devices in the network.

As shown in FIG. 3, an EH device (e.g., an RF receiver or a UE 120, among other examples) may receive signals (e.g., radio signals carried on radio waves) from a donor device (e.g., a transmitting device, an RF transmitter, a charging device, a base station 110, or a donor UE 120, among other examples) and convert electromagnetic energy of the signals (e.g., using a rectenna comprising a dipole antenna with an RF diode) into direct current electricity for use by the EH device. The EH device may be a low power device or a zero power device, among other examples.

As shown by reference number 305, in some aspects, the EH device may use a separated receiver architecture, where a first set of antennas is configured to harvest energy, and a second set of antennas is configured to receive data. In this scenario, each set of antennas may be separately configured to receive signals at certain times, frequencies, and/or via one or more particular beams, such that all signals received by the first set of antennas are harvested for energy, and all signals received by the second set of antennas are processed and/or decoded to receive information or other communications.

As shown by reference number 310, in some aspects, the EH device may use a time-switching architecture to harvest energy. The time switching architecture may use one or more antennas to receive signals, and whether the signals are harvested for energy or processed to receive information depends on the time at which the EH device receives the signals. For example, one or more first time slots may be time slots during which received signals are sent to one or more EH components to harvest energy, and one or more second time slots may be time slots during which received signals are processed and decoded to receive information. In some aspects, the time slots may be pre-configured (e.g., by the EH device, the donor device, or another device).

As shown by reference number 315, in some aspects, the EH device may use a power splitting architecture to harvest energy. The power splitting architecture may use one or more antennas to receive signals, and the signals are handled by one or both of the EH and/or information receiving components according to an EH rate. For example, the EH device may be configured to use a first portion of received signals for EH and the remaining received signals for information receiving. In some aspects, the EH rate may be pre-configured (e.g., by the EH device, the donor device, or another device).

The EH device may receive signals for EH on certain resources (e.g., time, frequency, and/or spatial resources) and at a certain power level that results in a particular charging rate. Energy harvested by the EH device may be used and/or stored for later use. For example, in some aspects, the EH device may be powered directly by the harvested energy. In some aspects, the EH device may use an energy storage device, such as a battery, capacitor, and/or supercapacitor, to gather and store harvested energy for immediate and/or later use.

As indicated above, FIG. 3 is provided as an example. Other examples may differ from what is described with regard to FIG. 3.

Figure 4:
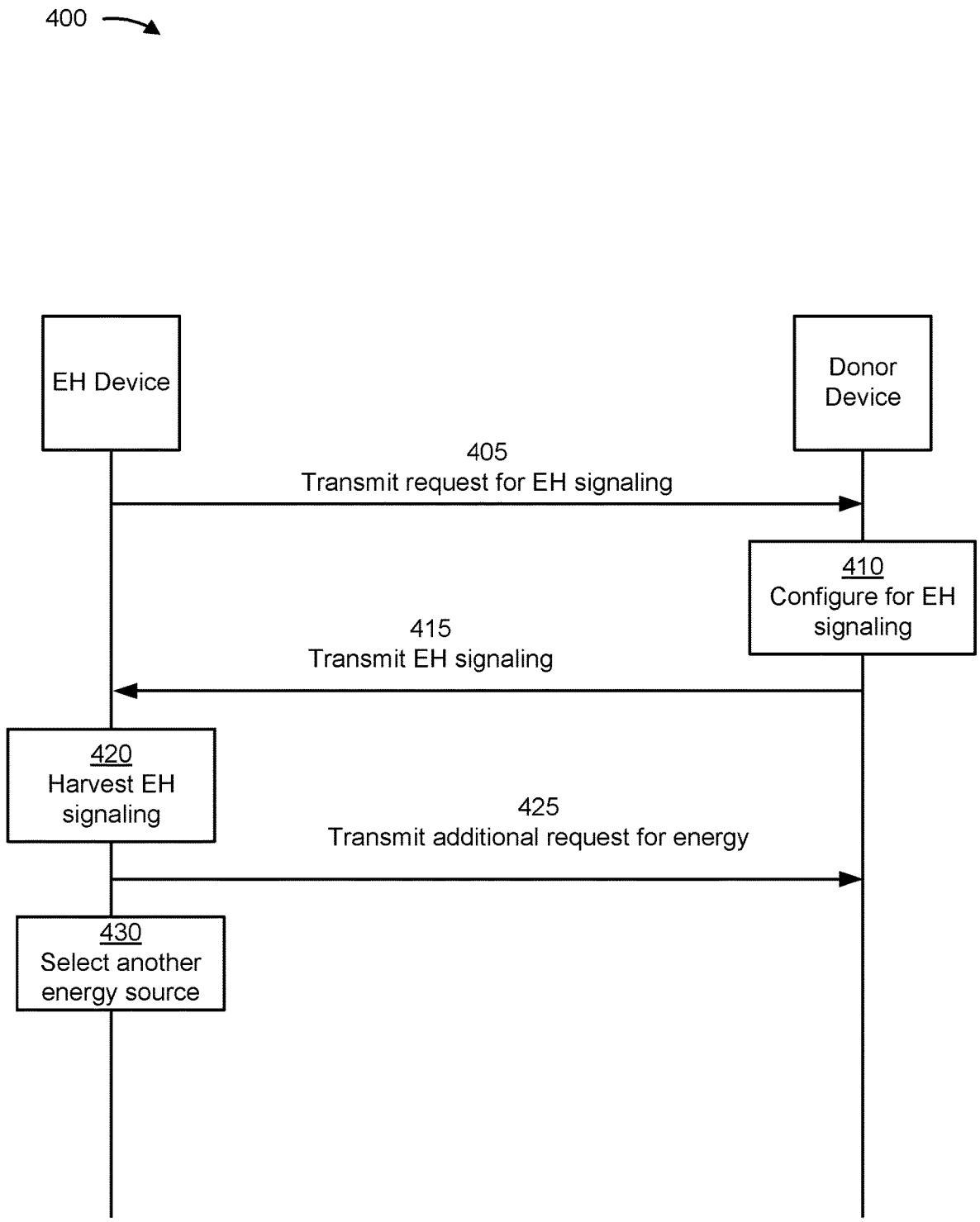
FIG. 4 is a diagram illustrating an example associated with a request for energy harvesting (EH) signaling, in accordance with the present disclosure.

FIG. 4 is a diagram illustrating an example 400 associated with a request for EH signaling, in accordance with the present disclosure. As shown in FIG. 4, an EH device (e.g., IoT, zero power device, a UE 120) may harvest energy from a donor device (e.g., base station 110, UE 120).

As shown by reference number 405, the EH device may transmit a request for energy. The request may include indications of a frequency range for EH signaling, an amount of energy requested, a maximum duration for which the request applies, and/or one or more additional parameters for transmission of the EH signaling.

As shown by reference number 410, the donor device may configure the donor device for EH signaling. For example, the donor device may configure itself for transmitting the EH signaling with one or more parameters to support EH by the EH device. For example, the donor device may configure one or more transmission antenna groups to transmit the EH signaling with a transmission power, a bandwidth, and/or a beam direction to provide the EH signaling to the EH device.

As shown by reference number 415, the donor device may transmit the EH signaling in a direction of the EH device. The EH signaling may be associated with a charging rate. For example, the charging rate may be based at least in part on a frequency of the EH signaling, a bandwidth of the EH signaling, and/or a received power at the EH device, among other examples.

As shown by reference number 420, the EH device may harvest the EH signaling. As described in connection with FIG. 3, the EH device may convert energy from the EH signaling into electrical energy for immediate use and/or may convert energy from the EH signaling into potential energy (e.g., chemical potential energy of the on-board energy storage device) for later use.

As shown by reference number 425, the EH device may transmit an additional request for energy. For example, the EH device may transmit the additional request for energy based at least in part on the EH device failing to harvest a sufficient amount of energy from the EH signaling. The EH device may fail to harvest the sufficient amount of energy based at least in part on the donor device failing to transmit the EH signaling, transmitting the EH signaling with an incorrect configuration, or the EH device consuming energy at a rate that is greater than expected when transmitting the request for EH signaling, or the EH device failing to receive energy from another energy source.

As shown by reference number 430, the EH device may select another energy source. For example, the EH device may select solar energy, vibration harvesting, or kinetic charging to obtain energy from an environment of the EH device.

As indicated above, FIG. 4 is provided as an example. Other examples may differ from what is described with respect to FIG. 4.

In some networks, a UE may be configured to support EH. For example, the UE may support EH based at least in part on transmitting EH signaling for an additional UE to obtain power via energy harvesting the EH signaling, and/or the UE may support EH based at least in part on performing EH on signaling received from a network node. The UE may be configured as a full-duplex UE that supports simultaneous transmissions (e.g., uplink communications, sideline communications, and/or EH signaling transmissions, among other examples) and receptions (e.g., downlink communications and/or sidelink communications, among other examples). In this way, the UE may communicate and perform EH simultaneously (e.g., transmitting EH signaling or harvesting EH signaling). However, transmitting a communication and/or receiving a communication simultaneously with performing EH may degrade performance of communications. For example, self-interference caused by transmitting EH signaling may degrade reception of a downlink communication or a sidelink communication. Additionally, or alternatively, performing EH on received signaling may reduce a signal strength of the received signal when attempting to receive a communication via the received signaling. Degrading performance of communications and/or scheduling conflicts between performing EH and transmitting and/or receiving a communication may cause communication errors, which may consume computing, power, network, and/or communication resources to detect or correct. Failing to perform EH in favor of transmitting and/or receiving a communication may cause one or more EH devices (e.g., the UE or another device) to deplete power and become inoperable.

In some aspects described herein, a UE may receive an indication of one or more parameters associated with management of multiple antenna groups of the UE for use in EH, transmitting communications, and/or receiving communications. The UE may transmit and/or receive signaling (e.g., EH signaling, a downlink communication, an uplink communication, and/or a sidelink communication, among other examples) based at least in part on the one or more parameters of the multiple antenna groups of the UE.

In some aspects, the UE may be a full-duplex UE that is configured with prioritization parameters (e.g., the one or more parameters associated with management of the multiple antenna groups) for different types of downlink receptions and EH signaling. For example, a data channel (e.g., a physical downlink shared channel (PDSCH) or a physical sidelink shared channel (PSSCH)) may be configured with a first number of priority levels and EH signaling (e.g., a charging signal) may be configured with a second number of priority levels. The priority levels for the different signaling types may be interwoven such that at least one priority level of the data channel is higher than at least one priority level of the EH signaling and at least one other priority level of the data channel is higher than at least one other priority level of the EH signaling. For example, priorities may be arranged as data channel priority 1, data channel priority 2, data channel priority 3, EH signaling priority 1, EH signaling channel priority 4, EH signaling priority 2.

Based at least in part on the UE receiving an allocation for a data channel communication having a priority that is higher than a conflicting EH signaling request (e.g., fully or partially overlapping in time and/or fully or partially overlapping in time and frequency, among other examples), the UE may prioritize the data channel communication and deprioritize the EH signaling. For example, the UE may drop the EH signaling request (e.g., refrain for transmitting the EH signaling), delegate the EH signaling to an additional donor UE (e.g., based at least in part on transmitting an indication to the additional donor UE to transmit the EH signaling), and/or reduce a charging rate of the EH signaling to a threshold level (e.g., associated with the EH signaling request) that corresponds to a self-interference threshold, among other examples. If the threshold charging rate is associated with an amount of self-interference that fails to satisfy the self-interference threshold (e.g., a maximum allowed self-interference), the UE may drop the EH signaling request.

In some aspects, the UE may transmit an indication of the threshold amount of self-interference, an associated charging rate that satisfies the self-interference threshold, and/or other parameters that indicate support by the UE for supplying EH signaling. In some aspects, an EH UE that requests the EH signaling may transmit an indication of the threshold charging rate as a minimum acceptable charging rate. The EH UE may transmit the indication via UE assistance information or in the request for the EH signaling.

Based at least in part on the UE receiving an allocation for a data channel communication having a priority that is lower than a conflicting EH signaling request (e.g., fully or partially overlapping in time and/or fully or partially overlapping in time and frequency, among other examples), the UE may deprioritize the data channel communication and prioritize the EH signaling. For example, the UE may drop reception of the data channel communication and refrain from attempting to decode the data channel communication. Alternatively, the UE may attempt to decode the data channel communication with the self-interference caused by transmitting the EH signaling.

In some aspects, the UE may be configured with specific behavior for one or more combinations of priority levels of the data channel and priority levels of the EH signaling. For example, for data channel priority level 3 and EH signaling priority level 2, the UE may reduce a charging rate from a requested charging rate to maintain a threshold level of self-interference. In some aspects, pairs of data channel priority level and EH signaling priority levels are configured with self-interference levels that the data channel can handle (e.g., that does not disrupt reception of the data channel communication). For example, for EH signaling priority level 2, data channel priority level 3 may not allow more than 5 dB of remaining self-interference power. In some aspects, according to resources of the EH signaling and the data channel communication overlapping and the self-interference associated with the EH signaling failing to satisfy an associated self-interference level, the UE may drop the EH signaling.

Based at least in part on the data channel and the EH signaling having associated priorities, the UE may prioritize transmitting the EH signaling or receiving the data channel communication. For example, the UE may determine to drop the EH signaling or drop the data channel communication based at least in part on the associated priorities. In this way, the UE may avoid degrading a high-priority data channel communication, which may conserve computing, power, communication, and/or network resources that may have otherwise been used to detect and correct communication errors. Additionally, or alternatively, the UE may prioritize a high priority EH, which may avoid depleting power of one or more EH devices that may have otherwise become inoperable.

In some aspects described herein, the UE may receive an allocation for a downlink communication and an allocation for an uplink communication (e.g., a dynamic grant or a configured grant) and may receive a request to transmit energy (e.g., a request for EH signaling). The UE may choose between transmitting the uplink communication or transmitting the EH signaling. In some aspects, the UE may be configured (e.g., via radio resource control (RRC) signaling) to determine whether to transmit the uplink communication or to transmit the EH signaling based at least in part on one or more parameters.

In some aspects, the UE may determine whether to transmit the uplink communication or to transmit the EH signaling based at least in part on a resulting self-interference of transmitting the EH signaling. For example, the UE may be configured (e.g., RRC configured) with a self-interference threshold that the downlink can handle. If the uplink transmission would cause self-interference that exceeds the self-interference threshold, but the EH signaling would not, the UE may drop the uplink transmission and transmit the EH signaling. Alternatively, if the uplink transmission would not cause self-interference that exceeds the self-interference threshold, but the EH signaling would, the UE may drop the EH signaling and transmit the uplink transmission. If both the uplink transmission and EH signaling would result in self-interference that exceeds the threshold, the UE may either drop both the uplink transmission and the EH signaling, drop the downlink reception, and/or attempt to decode the downlink communication and transmit one of the uplink transmission or the EH signaling based at least in part on the transmission with the smallest resulting self-interference. If neither of the uplink transmission and EH signaling would result in self-interference that does not exceed the threshold, the UE may select between the uplink transmission and the EH signaling based on half-duplex constrained priority rules.

In some aspects, the UE may determine whether to transmit the uplink communication or to transmit the EH signaling based at least in part on priorities of the downlink communication, the uplink communication, and the EH signaling (e.g., energy transfer signaling). The UE may be configured (e.g., RRC configured) with a priority triplet for the downlink communication, the uplink communication, and the EH signaling and may be configured with corresponding UE behavior for the priority triplet. For example, if a priority order is uplink>downlink>EH signaling, the UE may drop the EH signaling and fall back to a configuration of a full-duplex UE that does not support EH signaling. If the priority order is downlink>EH signaling>uplink, the UE may drop the uplink and may transmit the EH signaling. Based at least in part on the DL having a highest priority, the UE may change configurations (e.g., reduce transmission power or modify a beam direction) for transmission of the uplink communication or EH signaling to protect the DL from self-interference.

In some aspects, the UE may simultaneously transmit an uplink communication and EH signaling. The UE may jointly configure a transmission power of the uplink communication and a transmission power of the EH signaling such that a remaining self-interference resulting from both transmissions (e.g., on a downlink communication) satisfies a self-interference threshold. For example, uplink transmissions may be configured with a minimum transmission power to enable target a block error rate (BLER) at the network node, which may be used for a joint configuration of the transmission powers. The EH signaling may also be configured with a minimum power so that the EH signaling provides a sufficient amount of power to the EH device at a threshold charging rate.

In some aspects, the EH signaling may occur on a beam that is within a threshold angle from an uplink beam associated with the uplink communication. In this case, the UE may drop the EH signaling and use transmission of the uplink communication for the purpose of energy transfer to an EH device. In some aspects, parameters for determining to drop the EH signaling may be RRC configured and may reflect how useful the uplink transmission would be as the EH signaling. If the uplink transmission (e.g., based at least in part on transmission parameters) would provide an energy transfer that satisfies a charging threshold, the UE may drop the EH signaling and transmit only the uplink signal for both purposes.

In some aspects, a full-duplex UE with multi-panels may be able to support downlink, uplink, EH signaling simultaneously. The UE may be configured to transmit uplink and transmit EH signaling as long as an accumulated self-interference at the receiving end satisfies a self-interference threshold.

In some aspects described herein, a UE may be configured for joint data reception and EH. For example, the UE may be configured with a first number of antennas for reception, a second a number of antennas for EH, and a third number of antennas for transmission. The UE may select antennas that experience a highest amount of self-interference power for EH. For example, the UE may perform sweeping of a sounding reference signal (SRS) signal from the transmission antennas and sense a received power at each reception antenna. The UE may identify and/or report the antennas experiencing maximum self-interference. The UE may also identify and/or report the self-interference power received at antennas of the reception panel.

In some aspects, the UE may receive a signal (e.g., the received signal) that includes the downlink signal plus the self-interference. The UE applying EH would reduce the power of the received signal and the self-interference, thus impacting the received signal even though it is also reducing the interference power. The UE may also be associated with an EH rate that the UE is to apply along with an amount of required self-interference suppression. For example, the network node may indicate the EH rate and the self-interference suppression to use for one or more downlink communications. The self-interference suppression may be based at least in part on a pre-determined UE capability. For example, the UE may be capable of 10 dB interference reduction if digital pre-distortion (DPD) correction is applied, may be capable of 12 dB if non-linear interference cancelation (NLIC) is applied, and 15 dB if both DPD and NLIC are applied to a downlink communication. Different UEs may support different interference reduction techniques and may produce different interference reduction outcomes.

In some aspects, a power split of a downlink communication between data reception and EH may be based at least in part on a remaining self-interference and an indicated modulation and coding scheme (MCS) of the downlink communication. The UE may derive a charging rate associated with EH the downlink communication based at least in part on the remaining self-interference and the MCS of the downlink communication. For example, a full-duplex UE that performs simultaneous transmission, reception, and EH may be configured (e.g., RRC configured) with a defined relationship between the expected remaining self-interference power, the MCS of the downlink communication, and the charging rate. Upon reception of downlink scheduling, the UE identifies the MCS of the downlink communication and upon receiving an uplink grant, the UE may calculate an expected self-interference based on transmission power and associated beam directions, and the UE may determine (e.g., based at least in part on an RRC configuration) a charging rate for applying EH on the downlink communication.

Based at least in part on the UE being configured to prioritize between downlink communications, uplink communications, and/or EH signaling, the UE may reduce degradation of communications, which may conserve computing, communication, power, and/or network resources. Based at least in part on the UE configuring parameters for uplink communications and/or EH signaling, the UE may have an increased likelihood of supporting EH signaling, which may prevent one or more EH devices from depleting power resources and becoming inoperable.

Figure 5:
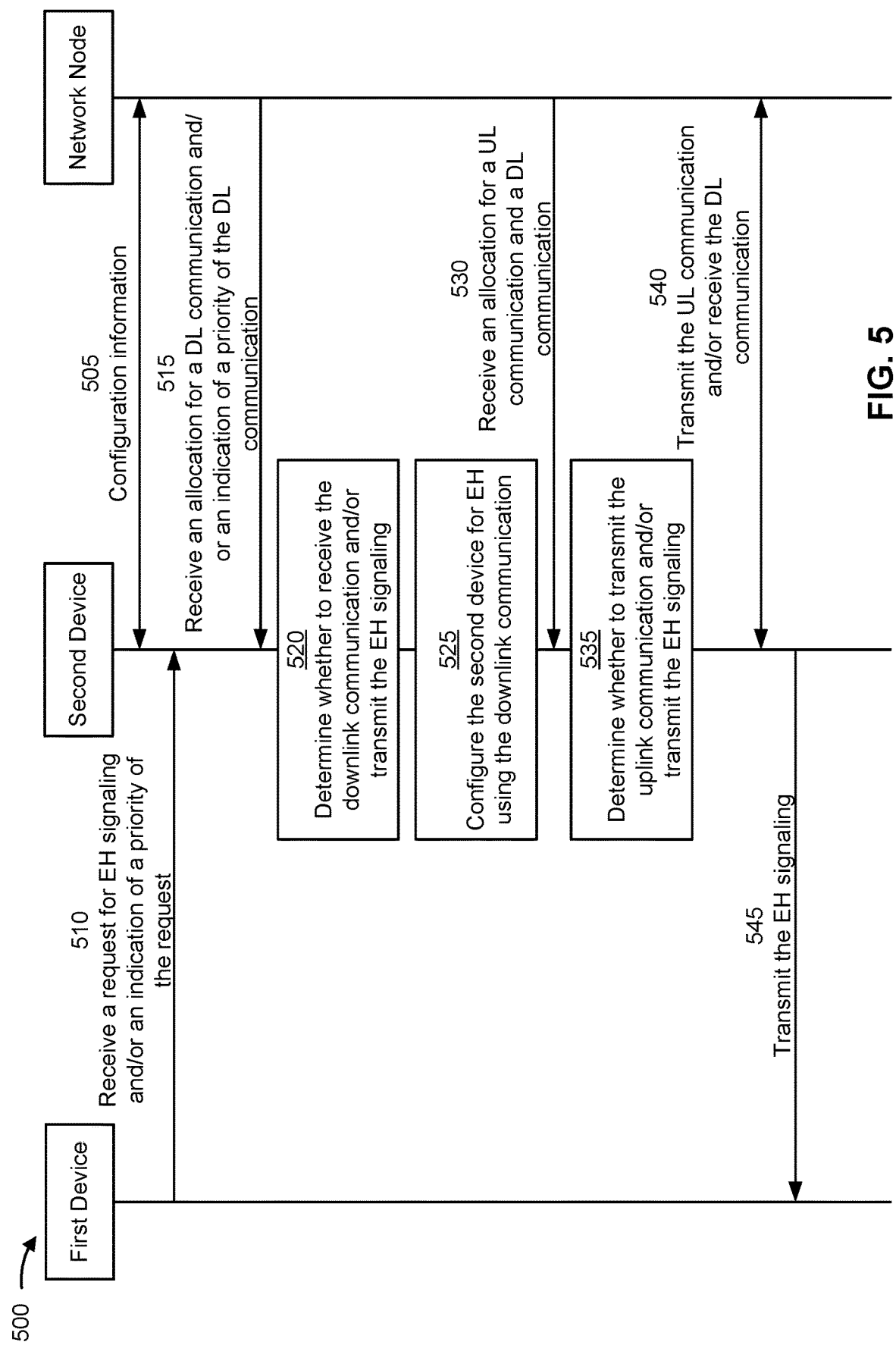
FIG. 5 is a diagram illustrating an example associated with energy harvesting management, in accordance with the present disclosure.

FIG. 5 is a diagram of an example 500 associated with EH management, in accordance with the present disclosure. As shown in FIG. 5, a first device (e.g., an EH UE) and/or a second device may communicate with a network node (e.g., a base station and/or an RU). The second device may be configured to transmit EH signaling to the first device and/or the second device may be configured to perform EH on one or more received signals to convert EH signaling into power. In some aspects, the network node, the first device, and/or the second devices may be part of a wireless network (e.g., wireless network 100). The first device, the second device, and the base station may have established a wireless connection prior to operations shown in FIG. 5. In some aspects, the second device may be configured for full duplex operation (e.g., in-band full duplexing or sub-band frequency domain duplexing).

As shown by reference number 505, the base station may transmit, and the UE may receive, configuration information. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the base station or other network device) for selection by the UE, and/or explicit configuration information for the UE to use to configure the UE, among other examples.

In some aspects, the configuration information may indicate that the UE is to support EH. In some aspects, the configuration information may indicate one or more parameters associated with management of multiple antenna groups of the UE for use in EH. For example, the one or more parameters may indicate how to select antenna groups for transmitting a communication, receiving a communication, transmitting EH signaling, or receiving EH signaling. In some aspects, the one or more parameters may indicate how to prioritize transmitting a communication, receiving a communication, transmitting EH signaling, and/or receiving EH signaling. In some aspects, the one or more parameters may indicate how to configure the UE (e.g., one or more of the multiple antenna groups and/or transmission or reception chains, among other examples) to support one or more of transmitting a communication, receiving a communication, transmitting EH signaling, and/or receiving EH signaling.

In some aspects, the one or more parameters may indicate a prioritization between one or more downlink communication types and transmissions of one or more EH signaling types. In some aspects, the pairs of the one or more downlink communication types and the one or more EH types are associated with an acceptable amount of expected self-interference caused by transmission of an EH signaling associated with the one or more EH signaling types.

The second device may configure itself based at least in part on the configuration information. In some aspects, the second device may be configured to perform one or more operations described herein based at least in part on the configuration information.

In some aspects, the second device may transmit configuration information back to the network node. For example, the second device may transmit a capability report and/or an indication of support for EH. In some aspects, the second device may transmit an indication of a capability associated with self-interference suppression at the UE.

As shown by reference number 510, the first device may transmit, and the second device may receive, a request for EH signaling associated with the first device and/or an indication of a priority of the request. In some aspects, the request may indicate a location and/or direction of the first device, an amount of charging requested (e.g., a duration of EH signaling), and/or a frequency for the EH signaling, among other examples. In some aspects, the request for EH signaling may indicate one or more acceptable charging rates for the EH signaling.

In some aspects, the second device may receive the request for EH signaling based at least in part on the second device being, or including, a candidate donor UE for EH. For example, the second device may advertise support for EH signaling, or the network node may advertise the second device for EH signaling. In some aspects, the second device may transmit (e.g., to the first device and/or to the network node, among other examples) an indication of one or more acceptable charging rates for transmission of EH signaling by the second device.

As shown by reference number 515, the second device may receive an allocation for a downlink communication and/or an indication of a priority of the downlink communication. The priority may indicate a priority relative to the priority of the priority for the request for EH signaling described in connection with reference number 510. For example, the priority of the downlink communication may be higher or lower than the priority of the request for EH signaling.

As shown by reference number 520, the second device may determine whether to receive the downlink communication and/or transmit the EH signaling. In some aspects, the second device may determine whether to receive the downlink communication and/or transmit the EH signaling based at least in part on priorities of the downlink communication and/or the EH signaling. For example, the second device may determine to transmit the EH signaling based at least in part on the downlink communication having a priority that is lower than that of the EH signaling. Alternatively, the second device may determine to refrain from transmitting the EH signaling based at least in part on the downlink communication having a priority that is higher than that of the EH signaling. The second device may determine to both transmit the EH signaling and receive the downlink communication based at least in part on priorities of the EH signaling and the downlink communication, based at least in part on capabilities of the second device, beam directions of the EH signaling and the downlink communication, antenna groups used for the EH signaling and the downlink communication, and/or based at least in part on an expected self-interference from the EH signaling on the downlink communication, among other examples.

In some aspects, the second device may refrain from transmitting the EH signaling, transmit an indication that an additional UE is to transmit the EH signaling, configure the EH signaling with a charging rate to reduce self-interference with the downlink communication, transmit the EH signaling at a requested charging rate and refraining from receiving the downlink communication, and/or transmit the EH signaling at the requested charging rate and attempt to decode the downlink communication.

In some aspects, the second device may determine to transmit the EH signaling or to refrain from transmitting the EH signaling based at least in part on an amount of self-interference expected for the one or more acceptable charging rates associated with the second device and/or the first device.

As shown by reference number 525, the second device may configure the second device for EH using the downlink communication. For example, the second device may configure one or more transmission parameters (e.g., antenna groups, transmission power, and/or transmission chains, among other examples) to perform EH using the downlink communication. For example, the second device may determine to perform EH on the downlink communication independently from (e.g., in the absence of) receiving the request for EH signaling described in connection with reference number 510.

The second device may determine an EH rate (e.g., a charging rate) to apply to the downlink communication for EH based at least in part on one or more of an MCS of the downlink communication and/or an expected self-interference at a reception antenna group. In some aspects, the second device may receive an indication of an EH rate to apply to a transmitted EH signaling and an amount of self-interference suppression to apply to a received signal. In some aspects, the indication of the EH rate and/or an amount of self-interference suppression may be based at least in part on an indication of a capability for self-interference suppression at the UE.

In some aspects, the second device may determine an antenna group to use for performing EH on the downlink communication based at least in part on having a highest amount of self-interference by a transmitting antenna group. In this way, the selected antenna group may have a lowest signal-to-interference-plus-noise ratio (SINR) for receiving the downlink communication before performing EH and/or may have a highest amount of energy to harvest.

As shown by reference number 530, the second device may receive, and the network node may transmit, an allocation for an uplink communication and a downlink communication. The uplink communication and/or the downlink communication may be associated with configured grants and/or dynamic grants, among other examples. In some aspects, the second device may receive the allocation for the uplink communication and the downlink communication independently from (e.g., in the absence of) the downlink communication described in connection with reference number 515. In some aspects, the allocation may indicate priorities and/or MCSs of the uplink communication and/or the downlink communication.

As shown by reference number 535, the second device may determine whether to transmit the uplink communication and/or transmit the EH signaling. For example, the second device may determine whether to transmit the uplink communication and/or to transmit the EH signaling based at least in part on priorities of the uplink communication, the EH signaling, and/or the downlink communication.

In some aspects, the second device may receive an indication of an EH rate to apply to a transmitted EH signaling and an amount of self-interference suppression to apply to a received signal.

In some aspects, the second device may be configured to receive the downlink communication having an MCS, transmit the uplink communication having an expected self-interference that is based at least in part on one or more of transmission power or a beam direction, and transmit the EH signaling having a charging rate that is based at least in part on the MCS and the expected self-interference of the uplink communication.

As shown by reference number 540, the second device may receive, and the network node may transmit, the downlink communication and/or the second device may transmit, and the network node may receive, the uplink communication. In some aspects, the second device may transmit the uplink communication and/or receive the downlink communication based at least in part on the one or more parameters of the multiple antenna groups of the UE.

As shown by reference number 545, the second device may transmit the EH signaling to the first device. In some aspects, the second device may transmit the EH signaling to the first device based at least in part on the one or more parameters of the multiple antenna groups of the second device.

In some aspects, the second device may receive the downlink communication and transmit only one of the uplink communication or the EH signaling. For example, the second device may transmit only one of the uplink communication or the EH signaling based at least in part on one or more selection parameters indicated by a network node (e.g., in connection with reference number 505). In some aspects, the one or more selection parameters may include an expected self-interference of the uplink communication satisfying a self-interference threshold, an expected self-interference of the EH signaling satisfying a self-interference threshold, a priority of the uplink communication, a priority of the EH signaling, and/or a priority of the downlink communication. In some aspects, the second device may drop the downlink communication and transmit one or more of the uplink communication or the EH signaling.

In some aspects, the second device may receive the downlink communication, transmit the uplink communication, and transmit the EH signaling. The second device may configure a first transmission power of the uplink communication and a second transmission power of the EH signaling to satisfy a total self-interference threshold.

In some aspects, the second device may receive the downlink communication, transmit the uplink communication, and refrain from transmitting the EH signaling based at least in part on a difference in direction between a first beam direction associated with the uplink communication and a second beam direction associated with the EH signaling satisfying a threshold.

In some aspects, the second device may receive the downlink communication, transmit the uplink communication, and transmit the EH signaling based at least in part on a total expected self-interference of the uplink communication and the EH signaling satisfying a self-interference threshold Based at least in part on the second device being configured to prioritize between downlink communications, uplink communications, and/or EH signaling, the UE may reduce degradation of communications, which may conserve computing, communication, power, and/or network resources. Based at least in part on the second device configuring parameters for uplink communications and/or EH signaling, the second device may have an increased likelihood of supporting EH signaling, which may prevent one or more EH devices from depleting power resources and becoming inoperable.

As indicated above, FIG. 5 is provided as an example. Other examples may differ from what is described with regard to FIG. 5.

Figure 6:
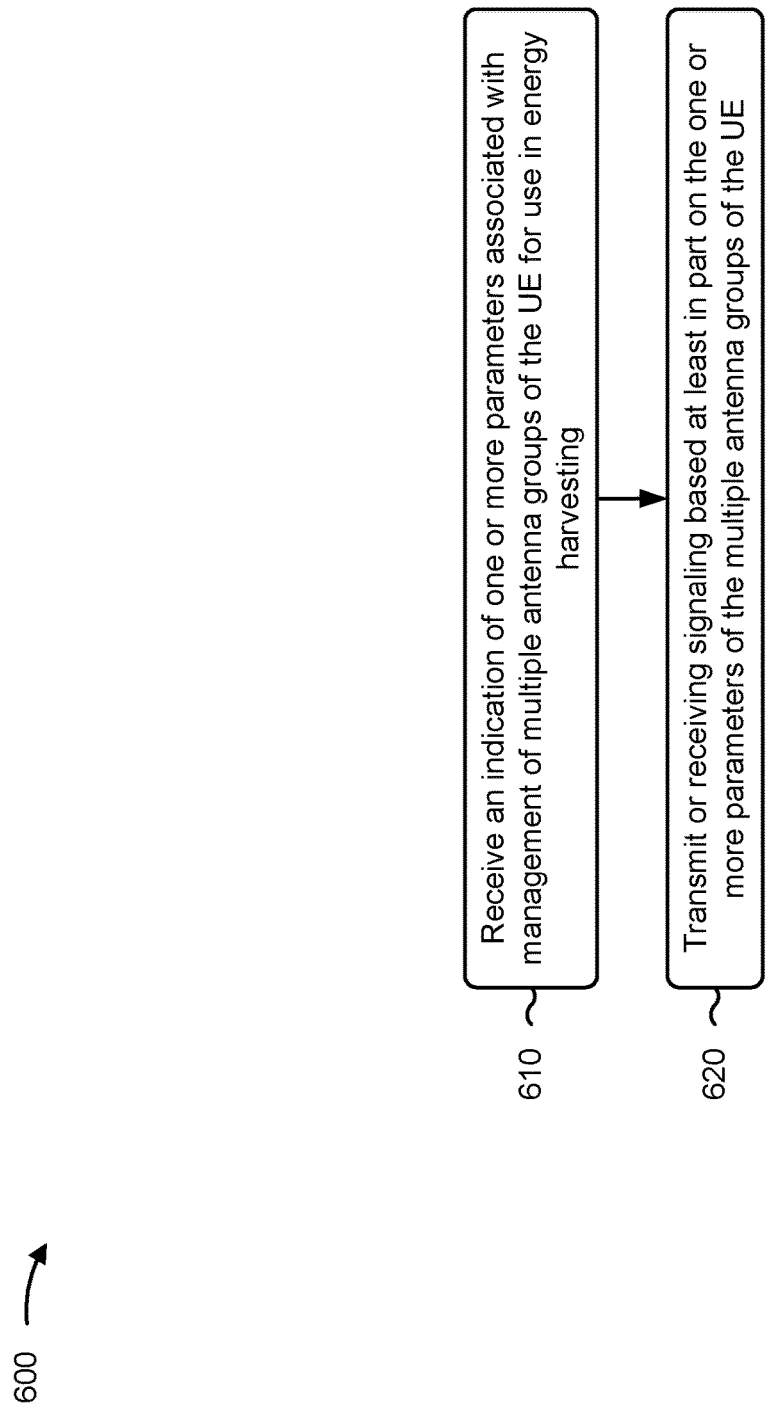
FIG. 6 is a diagram illustrating an example process associated with energy harvesting management, in accordance with the present disclosure.

FIG. 6 is a diagram illustrating an example process 600 performed, for example, by a UE, in accordance with the present disclosure. Example process 600 is an example where the UE (e.g., UE 120) performs operations associated with EH management.

As shown in FIG. 6, in some aspects, process 600 may include receiving an indication of one or more parameters associated with management of multiple antenna groups of the UE for use in EH (block 610). For example, the UE (e.g., using communication manager 140 and/or reception component 702, depicted in FIG. 7) may receive an indication of one or more parameters associated with management of multiple antenna groups of the UE for use in EH, as described above.

As further shown in FIG. 6, in some aspects, process 600 may include transmitting or receiving signaling based at least in part on the one or more parameters of the multiple antenna groups of the UE (block 620). For example, the UE (e.g., using communication manager 140 and/or transmission component 704, depicted in FIG. 7) may transmit or receive signaling based at least in part on the one or more parameters of the multiple antenna groups of the UE, as described above.

Process 600 may include additional aspects, such as any single aspect or any combination of aspects described below and/or in connection with one or more other processes described elsewhere herein.

In a first aspect, the UE comprises a candidate donor UE for EH, wherein the one or more parameters indicate a prioritization between one or more downlink communication types and transmissions of one or more EH signaling types.

In a second aspect, alone or in combination with the first aspect, process 600 includes receiving an allocation of a downlink communication associated with a downlink communication type having a first priority, and receiving a request to transmit an EH signaling having a second priority, wherein transmitting or receiving signaling comprises, based at least in part on the first priority and the second priority, one or more of refraining from transmitting the EH signaling, transmitting an indication that an additional UE is to transmit the EH signaling, configuring the EH signaling with a charging rate to reduce self-interference with the downlink communication, transmitting the EH signaling at a requested charging rate and refraining from receiving the downlink communication, or transmitting the EH signaling at the requested charging rate and attempting to decode the downlink communication.

In a third aspect, alone or in combination with one or more of the first and second aspects, process 600 includes one or more of receiving an indication of one or more acceptable charging rates for the EH signaling, transmitting an indication of one or more acceptable charging rates for the EH signaling, or selectively transmitting the EH signaling or refraining from transmitting the EH signaling based at least in part on an amount of self-interference expected for the one or more acceptable charging rates.

In a fourth aspect, alone or in combination with one or more of the first through third aspects, pairs of the one or more downlink communication types and the one or more EH signaling types are associated with an acceptable amount of expected self-interference caused by transmission of an EH signaling associated with the one or more EH signaling types.

In a fifth aspect, alone or in combination with one or more of the first through fourth aspects, process 600 includes receiving an indication of an EH rate to apply to a transmitted EH signaling and an amount of self-interference suppression to apply to a received signal.

In a sixth aspect, alone or in combination with one or more of the first through fifth aspects, process 600 includes transmitting an indication of a capability associated with self-interference suppression at the UE, wherein the indication of the EH rate and the amount of self-interference suppression is based at least in part on the indication of the capability.

In a seventh aspect, alone or in combination with one or more of the first through sixth aspects, transmitting or receiving signaling comprises receiving a downlink communication having a MCS, transmitting an uplink communication having an expected self-interference that is based at least in part on one or more of transmission power or a beam direction, and transmitting an EH signaling having a charging rate that is based at least in part on the MCS and the expected self-interference of the uplink communication.

In an eighth aspect, alone or in combination with one or more of the first through seventh aspects, transmitting or receiving signaling comprises receiving a downlink communication, and one or more of transmitting an uplink communication associated with an uplink grant, or transmitting an EH signaling.

In a ninth aspect, alone or in combination with one or more of the first through eighth aspects, process 600 includes transmitting the uplink communication or the EH signaling based at least in part on one or more selection parameters indicated by a network node.

In a tenth aspect, alone or in combination with one or more of the first through ninth aspects, the one or more selection parameters comprise one or more of an expected self-interference of the uplink communication satisfying a self-interference threshold, an expected self-interference of the EH signaling satisfying a self-interference threshold, a priority of the uplink communication, a priority of the EH signaling, or a priority of the downlink communication.

In an eleventh aspect, alone or in combination with one or more of the first through tenth aspects, process 600 includes configuring a first transmission power of the uplink communication and a second transmission power of the EH signaling to satisfy a total self-interference threshold, wherein transmitting or receiving signaling comprises receiving the downlink communication, transmitting the uplink communication, and transmitting the EH signaling.

In a twelfth aspect, alone or in combination with one or more of the first through eleventh aspects, transmitting or receiving signaling comprises receiving the downlink communication, transmitting the uplink communication, and refraining from transmitting the EH signaling based at least in part on a difference in direction between a first beam direction associated with the uplink communication and a second beam direction associated with the EH signaling satisfying a threshold.

In a thirteenth aspect, alone or in combination with one or more of the first through twelfth aspects, transmitting or receiving signaling comprises receiving the downlink communication, transmitting the uplink communication, and transmitting the EH signaling based at least in part on a total expected self-interference of the uplink communication and the EH signaling satisfying a self-interference threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
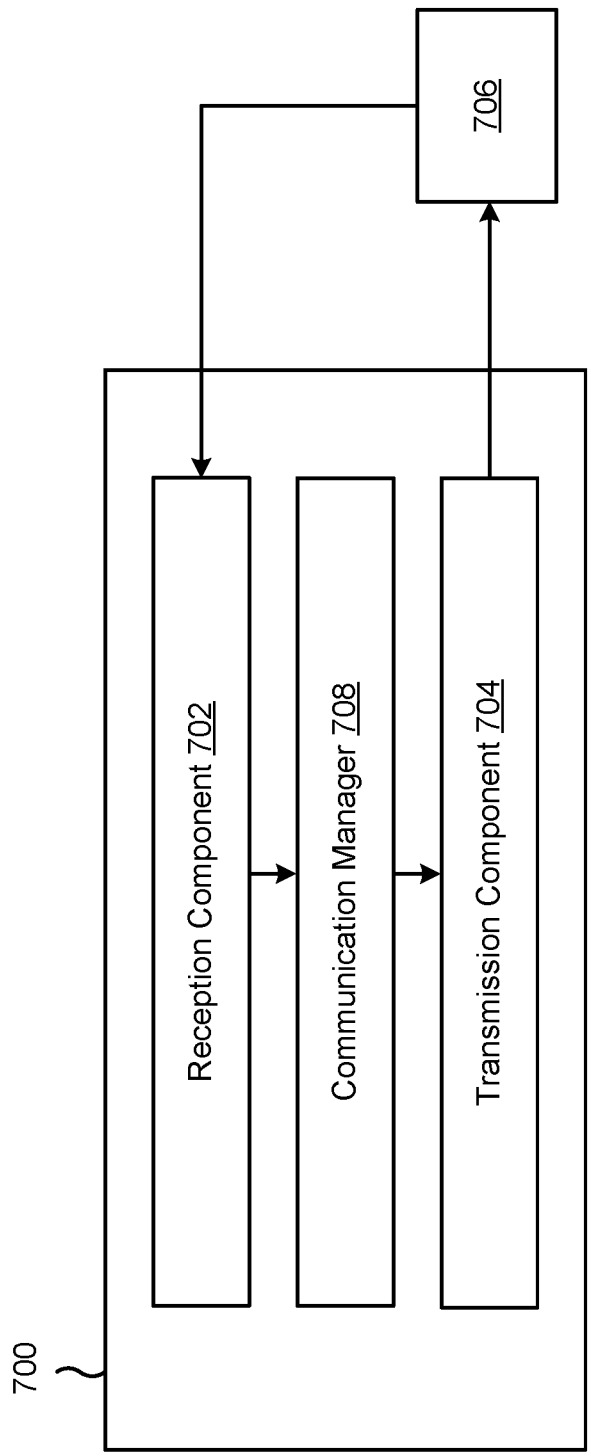
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., the communication manager 140).

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component)

may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an indication of one or more parameters associated with management of multiple antenna groups of the UE for use in EH. The transmission component 704 may transmit or receive signaling based at least in part on the one or more parameters of the multiple antenna groups of the UE.

The reception component 702 may receive an allocation of a downlink communication associated with a downlink communication type having a first priority.

The reception component 702 may receive a request to transmit an EH signaling having a second priority wherein transmitting or receiving signaling comprises, based at least in part on the first priority and the second priority, one or more of: refraining from transmitting the EH signaling; transmitting an indication that an additional UE is to transmit the EH signaling; configuring the EH signaling with a charging rate to reduce self-interference with the downlink communication; transmitting the EH signaling at a requested charging rate and refraining from receiving the downlink communication; or transmitting the EH signaling at the requested charging rate and attempting to decode the downlink communication.

The reception component 702 may receive an indication of an EH rate to apply to a transmitted EH signaling and an amount of self-interference suppression to apply to a received signal.

The transmission component 704 may transmit an indication of a capability associated with self-interference suppression at the UE wherein the indication of the EH rate and the amount of self-interference suppression is based at least in part on the indication of the capability.

The transmission component 704 may transmit the uplink communication or the EH signaling based at least in part on one or more selection parameters indicated by a network node.

The communication manager 708 may configure a first transmission power of the uplink communication and a second transmission power of the EH signaling to satisfy a total self-interference threshold wherein transmitting or receiving signaling comprises receiving the downlink communication, transmitting the uplink communication, and transmitting the EH signaling.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving an indication of one or more parameters associated with management of multiple antenna groups of the UE for use in energy harvesting; and transmitting or receiving signaling based at least in part on the one or more parameters of the multiple antenna groups of the UE.

Aspect 2: The method of Aspect 1, wherein the UE comprises a candidate donor UE for energy harvesting, wherein the one or more parameters indicate a prioritization between one or more downlink communication types and transmissions of one or more energy harvesting signaling types.

Aspect 3: The method of Aspect 2, further comprising: receiving an allocation of a downlink communication associated with a downlink communication type having a first priority; and receiving a request to transmit energy harvesting signaling having a second priority, wherein transmitting or receiving signaling comprises, based at least in part on the first priority and the second priority, one or more of: refraining from transmitting the energy harvesting signaling; transmitting an indication that an additional UE is to transmit the energy harvesting signaling; configuring the energy harvesting signaling with a charging rate to reduce self-interference with the downlink communication; transmitting the energy harvesting signaling at a requested charging rate and refraining from receiving the downlink communication; or transmitting the energy harvesting signaling at the requested charging rate and attempting to decode the downlink communication.

Aspect 4: The method of Aspect 3, further comprising one or more of: receiving an indication of one or more acceptable charging rates for the energy harvesting signaling; transmitting an indication of one or more acceptable charging rates for the energy harvesting signaling; or selectively transmitting the energy harvesting signaling or refraining from transmitting the energy harvesting signaling based at least in part on an amount of self-interference expected for the one or more acceptable charging rates.

Aspect 5: The method of any of Aspects 2-4, wherein pairs of the one or more downlink communication types and the one or more energy harvesting signaling types are associated with an acceptable amount of expected self-interference caused by transmission of energy harvesting signaling associated with the one or more energy harvesting signaling types.

Aspect 6: The method of any of Aspects 1-5, further comprising: receiving an indication of an energy harvesting rate to apply to a transmitted energy harvesting signaling and an amount of self-interference suppression to apply to a received signal.

Aspect 7: The method of Aspect 6, further comprising: transmitting an indication of a capability associated with self-interference suppression at the UE, wherein the indication of the energy harvesting rate and the amount of self-interference suppression is based at least in part on the indication of the capability.

Aspect 8: The method of any of Aspects 1-7, wherein transmitting or receiving signaling comprises: receiving a downlink communication having a modulation and coding scheme (MCS); transmitting an uplink communication having an expected self-interference that is based at least in part on one or more of transmission power or a beam direction; and transmitting energy harvesting signaling having a charging rate that is based at least in part on the MCS and the expected self-interference of the uplink communication.

Aspect 9: The method of any of Aspects 1-8, wherein transmitting or receiving signaling comprises: receiving a downlink communication; and one or more of: transmitting an uplink communication associated with an uplink grant; or transmitting energy harvesting signaling.

Aspect 10: The method of Aspect 9, selectively transmitting the uplink communication or transmitting the energy harvesting signaling comprises: transmitting the uplink communication or the energy harvesting signaling based at least in part on one or more selection parameters indicated by a network node.

Aspect 11: The method of Aspect 10, wherein the one or more selection parameters comprise one or more of: an expected self-interference of the uplink communication satisfying a self-interference threshold, an expected self-interference of the energy harvesting signaling satisfying a self-interference threshold, a priority of the uplink communication, a priority of the energy harvesting signaling, or a priority of the downlink communication.

Aspect 12: The method of any of Aspects 9-11, further comprising: configuring a first transmission power of the uplink communication and a second transmission power of the energy harvesting signaling to satisfy a total self-interference threshold, wherein transmitting or receiving signaling comprises receiving the downlink communication, transmitting the uplink communication, and transmitting the energy harvesting signaling.

Aspect 13: The method of any of Aspects 9-12, wherein transmitting or receiving signaling comprises receiving the downlink communication, transmitting the uplink communication, and refraining from transmitting the energy harvesting signaling based at least in part on a difference in direction between a first beam direction associated with the uplink communication and a second beam direction associated with the energy harvesting signaling satisfying a threshold.

Aspect 14: The method of any of Aspects 9-12, wherein transmitting or receiving signaling comprises receiving the downlink communication, transmitting the uplink communication, and transmitting the energy harvesting signaling based at least in part on a total expected self-interference of the uplink communication and the energy harvesting signaling satisfying a self-interference threshold.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors operatively coupled to the memory, the one or more processors configured to:
      receive an indication of one or more parameters associated with management of multiple antenna groups of the UE for use in energy harvesting, the energy harvesting comprising a conversion of electromagnetic energy of signals to direct current electricity, wherein the one or more parameters indicate a prioritization between one or more downlink communication types and transmissions of one or more energy harvesting signaling types; and
      transmit or receive signaling based at least in part on the one or more parameters of the multiple antenna groups of the UE.

2. The UE of claim 1, wherein the UE comprises a candidate donor UE for energy harvesting.

3. The UE of claim 2, wherein the one or more processors are further configured to:
   receive an allocation of a downlink communication associated with a downlink communication type having a first priority; and
   receive a request to transmit energy harvesting signaling having a second priority,
   wherein the one or more processors, to transmit or receive signaling and based at least in part on the first priority and the second priority, are configured to:
      refrain from transmitting the energy harvesting signaling;
      transmit an indication that an additional UE is to transmit the energy harvesting signaling;
      configure the energy harvesting signaling with a charging rate to reduce self-interference with the downlink communication;
      transmit the energy harvesting signaling at a requested charging rate and refraining from receiving the downlink communication;
      transmit the energy harvesting signaling at the requested charging rate and attempting to decode the downlink communication; or
      a combination thereof.

4. The UE of claim 3, wherein the one or more processors are further configured to:
   receive an indication of one or more acceptable charging rates for the energy harvesting signaling;
   transmit the indication of the one or more acceptable charging rates for the energy harvesting signaling;
   selectively transmit the energy harvesting signaling or refraining from transmitting the energy harvesting signaling based at least in part on an amount of self-interference expected for the one or more acceptable charging rates; or
   a combination thereof.

5. The UE of claim 2, wherein pairs of the one or more downlink communication types and the one or more energy harvesting signaling types are associated with an acceptable amount of expected self-interference caused by transmission of energy harvesting signaling associated with the one or more energy harvesting signaling types.

6. The UE of claim 1, wherein the one or more processors are further configured to:
   receive an indication of an energy harvesting rate to apply to a transmitted energy harvesting signaling and an amount of self-interference suppression to apply to a received signal.

7. The UE of claim 6, wherein the one or more processors are further configured to:
   transmit an indication of a capability associated with self-interference suppression at the UE,
   wherein the indication of the energy harvesting rate and the amount of self-interference suppression is based at least in part on the indication of the capability.

8. The UE of claim 1, wherein the one or more processors, to transmit or receive signaling, are configured to:
   receive a downlink communication having a modulation and coding scheme (MCS);
   transmit an uplink communication having an expected self-interference that is based at least in part on one or more of transmission power or a beam direction; and
   transmit energy harvesting signaling having a charging rate that is based at least in part on the MCS and the expected self-interference of the uplink communication.

9. The UE of claim 1, wherein the one or more processors, to transmit or receive signaling, are configured to:
   receive a downlink communication; and one or more of:
      transmit an uplink communication associated with an uplink grant; or
      transmit energy harvesting signaling.

10. The UE of claim 9, wherein the one or more processors, to selectively transmit the uplink communication or transmit the energy harvesting signaling, are configured to:
   transmit the uplink communication or the energy harvesting signaling based at least in part on one or more selection parameters indicated by a network node.

11. The UE of claim 10, wherein the one or more selection parameters comprise one or more of:
   an expected self-interference of the uplink communication satisfying a self-interference threshold,
   an expected self-interference of the energy harvesting signaling satisfying a self-interference threshold, a priority of the uplink communication,
a priority of the energy harvesting signaling, or
a priority of the downlink communication.

12. The UE of claim 9, wherein the one or more processors are further configured to:
configure a first transmission power of the uplink communication and a second transmission power of the energy harvesting signaling to satisfy a total self-interference threshold,
wherein the one or more processors, to transmit or receive signaling, are configured to receive the downlink communication, transmitting the uplink communication, and transmitting the energy harvesting signaling.

13. The UE of claim 9, wherein the one or more processors, to transmit or receive signaling, are configured to receive the downlink communication, transmit the uplink communication, and refrain from transmitting the energy harvesting signaling based at least in part on a difference in direction between a first beam direction associated with the uplink communication and a second beam direction associated with the energy harvesting signaling satisfying a threshold.

14. The UE of claim 9, wherein the one or more processors, to transmit or receive signaling, are configured to receive the downlink communication, transmit the uplink communication, and transmit the energy harvesting signaling based at least in part on a total expected self-interference of the uplink communication and the energy harvesting signaling satisfying a self-interference threshold.

15. A method of wireless communication performed by a user equipment (UE), comprising:
receiving an indication of one or more parameters associated with management of multiple antenna groups of the UE for use in energy harvesting, the energy harvesting comprising a conversion of electromagnetic energy of signals to direct current electricity, wherein the one or more parameters indicate a prioritization between one or more downlink communication types and transmissions of one or more energy harvesting signaling types; and
transmitting or receiving signaling based at least in part on the one or more parameters of the multiple antenna groups of the UE.

16. The method of claim 15, wherein the UE comprises a candidate donor UE for energy harvesting.

17. The method of claim 16, further comprising:
receiving an allocation of a downlink communication associated with a downlink communication type having a first priority; and
receiving a request to transmit energy harvesting signaling having a second priority,
wherein transmitting or receiving signaling comprises, based at least in part on the first priority and the second priority, one or more of:
refraining from transmitting the energy harvesting signaling;
transmitting an indication that an additional UE is to transmit the energy harvesting signaling;
configuring the energy harvesting signaling with a charging rate to reduce self-interference with the downlink communication;
transmitting the energy harvesting signaling at a requested charging rate and refraining from receiving the downlink communication; or
transmitting the energy harvesting signaling at the requested charging rate and attempting to decode the downlink communication.

18. The method of claim 17, further comprising one or more of:
receiving an indication of one or more acceptable charging rates for the energy harvesting signaling;
transmitting the indication of the one or more acceptable charging rates for the energy harvesting signaling; or
selectively transmitting the energy harvesting signaling or refraining from transmitting the energy harvesting signaling based at least in part on an amount of self-interference expected for the one or more acceptable charging rates.

19. The method of claim 16, wherein pairs of the one or more downlink communication types and the one or more energy harvesting signaling types are associated with an acceptable amount of expected self-interference caused by transmission of energy harvesting signaling associated with the one or more energy harvesting signaling types.

20. The method of claim 15, further comprising:
receiving an indication of an energy harvesting rate to apply to a transmitted energy harvesting signaling and an amount of self-interference suppression to apply to a received signal.

21. The method of claim 20, further comprising:
transmitting an indication of a capability associated with self-interference suppression at the UE, wherein the indication of the energy harvesting rate and the amount of self-interference suppression is based at least in part on the indication of the capability.

22. The method of claim 15, wherein transmitting or receiving signaling comprises:
receiving a downlink communication having a modulation and coding scheme (MCS);
transmitting an uplink communication having an expected self-interference that is based at least in part on one or more of transmission power or a beam direction; and
transmitting energy harvesting signaling having a charging rate that is based at least in part on the MCS and the expected self-interference of the uplink communication.

23. The method of claim 15, wherein transmitting or receiving signaling comprises:
receiving a downlink communication; and one or more of:
transmitting an uplink communication associated with an uplink grant; or
transmitting energy harvesting signaling.

24. The method of claim 23, wherein selectively transmitting the uplink communication or transmitting the energy harvesting signaling comprises:
transmitting the uplink communication or the energy harvesting signaling based at least in part on one or more selection parameters indicated by a network node.

25. The method of claim 24, wherein the one or more selection parameters comprise one or more of:
an expected self-interference of the uplink communication satisfying a self-interference threshold,
an expected self-interference of the energy harvesting signaling satisfying a self-interference threshold,
a priority of the uplink communication,
a priority of the energy harvesting signaling, or
a priority of the downlink communication.

26. The method of claim 23, further comprising:
configuring a first transmission power of the uplink communication and a second transmission power of the energy harvesting signaling to satisfy a total self-interference threshold,
wherein transmitting or receiving signaling comprises receiving the downlink communication, transmitting the uplink communication, and transmitting the energy harvesting signaling.

27. The method of claim 23, wherein transmitting or receiving signaling comprises receiving the downlink communication, transmitting the uplink communication, and refraining from transmitting the energy harvesting signaling based at least in part on a difference in direction between a first beam direction associated with the uplink communication and a second beam direction associated with the energy harvesting signaling satisfying a threshold.

28. The method of claim 23, wherein transmitting or receiving signaling comprises receiving the downlink communication, transmitting the uplink communication, and transmitting the energy harvesting signaling based at least in part on a total expected self-interference of the uplink communication and the energy harvesting signaling satisfying a self-interference threshold.

29. A non-transitory computer-readable medium storing a set of instructions for wireless communication, the set of instructions comprising:
   one or more instructions that, when executed by one or more processors of a user equipment (UE), cause the UE to:
      receive an indication of one or more parameters associated with management of multiple antenna groups of the UE for use in energy harvesting, the energy harvesting comprising a conversion of electromagnetic energy of signals to direct current electricity, wherein the one or more parameters indicate a prioritization between one or more downlink communication types and transmissions of one or more energy harvesting signaling types; and
      transmit or receive signaling based at least in part on the one or more parameters of the multiple antenna groups of the UE.

30. An apparatus for wireless communication, comprising:
   means for receiving an indication of one or more parameters associated with management of multiple antenna groups of the apparatus for use in energy harvesting, the energy harvesting comprising a conversion of electromagnetic energy of signals to direct current electricity, wherein the one or more parameters indicate a prioritization between one or more downlink communication types and transmissions of one or more energy harvesting signaling types; and
   means for transmitting or receiving signaling based at least in part on the one or more parameters of the multiple antenna groups of the apparatus.

* * * * *